United States Patent Office.

MICHELE FERRO, OF IUKA, MISSISSIPPI.

Letters Patent No. 107,024, dated September 6, 1870.

IMPROVEMENT IN MEDICAL COMPOUND FOR THE CURE OF FEVER AND AGUE.

The Schedule referred to in these Letters Patent and making part of the same.

*To all whom it may concern:*

Be it known that I, MICHELE FERRO, of Iuka, in the county of Tishemingo and State of Mississippi, have invented a new and useful Improvement in Medical Compound; and I do hereby declare that the following is full, clear, and exact description thereof, which will enable others skilled in the art to make and use the same.

This invention and discovery relates to a new and useful composition to be used as a medium for the cure of chills and other diseases, and consists in the ingredients hereinafter mentioned, combined in about the proportions named, to wit:

To one gallon of good gin, I add *hierapicra*, two ounces; rhubarb, two ounces; aloes, one ounce; camomile flowers, four ounces.

When the above mentioned ingredients are thoroughly mixed, the compound is allowed to stand for the space of six days. It is then filtered or drawn off into bottles of convenient size, and is ready for use.

This composition is taken as a medicine, and is most efficacious in the cure of fever and ague, or chill fever, cholera morbus, chronic diarrhea, colic, &c.

Having thus described my invention,

I claim as new and desire to secure by Letters Patent—

The above described medical compound, substantially as and for the purposes specified.

MICHELE FERRO.

Witnesses:
N. S. PATTERSON,
T. W. BARNETT.